United States Patent [19]

Booth et al.

[11] Patent Number: 4,484,203
[45] Date of Patent: Nov. 20, 1984

[54] METHOD AND SYSTEM FOR REGISTRATION IN CRT TYPESETTING

[75] Inventors: Thomas A. Booth, Flanders, N.J.; Frank L. Scholten, Katonah, N.Y.

[73] Assignee: AM International, Inc., Chicago, Ill.

[21] Appl. No.: 384,305

[22] Filed: Jun. 2, 1982

[51] Int. Cl.³ .................. G01D 15/06; G05F 1/00
[52] U.S. Cl. ........................ 346/160; 315/398; 346/110 V
[58] Field of Search ............ 346/1.1, 158, 161, 110 R, 346/110 V; 315/10, 398; 358/69; 354/5

[56] References Cited

U.S. PATENT DOCUMENTS

| | | | |
|---|---|---|---|
| 3,189,780 | 6/1965 | Takagi et al. | 315/10 |
| 3,562,718 | 2/1971 | Manber | 346/110 R |
| 3,621,137 | 11/1971 | Manber | 346/110 R |

*Primary Examiner*—Thomas H. Tarcza
*Attorney, Agent, or Firm*—Nicholas A. Camasto

[57] ABSTRACT

Registration is maintained as between an electron beam and that portion of a light-emissive interface selected for visualizing beam-defined characters by providing a discernible indicium on the interface at a location exterior to the selected interface portion and interacting the beam with interface area inclusive of the indicium. Signals are generated by a detector viewing such interface area and information for correction of beam deflection is obtained from the signals.

28 Claims, 13 Drawing Figures

METHOD AND SYSTEM FOR REGISTRATION IN CRT TYPESETTING

FIELD OF INVENTION

This invention relates generally to electron beam character generation and visualization and pertains more particularly to registration control between an electron beam and a visualizing interface.

BACKGROUND OF THE INVENTION

In recent years, the field of computer typesetting has inclined increasingly to the use of a cathode ray tube (CRT) for visualization of text and optical conveyance of the visualized text to a light-sensitive recording medium.

So-called "patchwork" is a practice common to various known schemes. In this practice, one defines a patch of the screen, i.e., a subdivision thereof, to be the area needed for the visualization of the largest single character to be recorded. On a horizontal CRT line basis, successive such patches are visualized, some involving presentation of the single largest character and other patches entailing presentation of a plurality of smaller characters which can fit the patch. As each patch is visualized, it is focused upon a recording medium. A recording lens is thus moved into registry with each visualized patch to effect full line recording. The recording medium is itself advanced transversely to the direction of lens movement to effect full page recording.

As patches are linewise accumulated, horizontal presentation nonuniformity becomes evident as equipment components vary in character, e.g., as amplifiers age, as resistors vary, as CRT high voltage changes, and as deflection yokes vary in beam deflecting characteristics. Thus, the most carefully initially trimmed system will remain in calibration only temporarily and the user must retrim to his evident productivity disadvantage and maintenance expense. Between retrimmings, the user may live with varying degrees of discernible patchwork. Prior to the subject invention, this labor intensive situation has been mollified only at the considerable expense of electronic components of quite high standards of tolerance which serve inherently to lessen patchwork discernibility. On the other hand, it would be a desiratum to have the retrimmings programable, e.g., to occur after each one hundred lines of text, or key-called by the operator at his option.

SUMMARY OF THE INVENTION

The present invention has as its primary object the establishing and maintenance of registration between an electron beam and a visualizing interface in the course of variation of beam control circuit performance and during system operation.

A more particular object of the invention is to relieve the above-discussed dependency of CRT typesetting upon high tolerance standard components or alternative downtime for frequent retrimmings.

In attaining these and other objects, the invention provides, in a method for using an electron beam-light emission interface for optical recording of information defined in the electron beam, (a) selection of a portion of the interface for presentation of beam-generated information to be optically recorded, (b) placement of the selected interface portion in optical communication with a recording medium, and (c) interaction of the beam with the interface in a location thereof exterior to the selected interface portion to effect registration of beam-generated information with the selected interface portion.

System is provided by the invention for providing registration of an information-defining electron beam with a selected portion of an electron beam-light emission interface, comprising (a) discernible means with the interface for defining a location on the interface having a predetermined spatial relation to the selected interface portion, (b) detector means having a field of view inclusive of the discernible means and adjacent interface area for generating output signals, (c) a beam deflection controller, and (d) circuit means connected to the detector means and the controller for operating the controller responsively to the output signals of the detector means.

Alternatively to the use of discernible means (a), systems in accordance with the invention may employ detector means having a field of view limited to locations of the interface having predetermined spatial relation to the selected interface portion, light being focused from such locations onto the detector means.

In a preferred practice of the invention, the discernible means is constituted by electron beam burning away of a strip of the phosphor layer of a CRT in a location outboard of the CRT faceplate portion selected for displaying information to be recorded. The detector means is a photodiode viewing the strip and generating output signals during horizontally stepped scanning. A first digital-to-analog converter has an output voltage swing in excess of that needed to cover the selected faceplate portion. The output of a second digital-to-analog converter attenuates that of the first digital-to-analog converter to the voltage swing equal to that required to cover the selected faceplate portion, such second converter output being modified as needed to maintain this condition by control information indicated in the photodiode output signals.

The foregoing and other objects and features of the invention will be understood from the following detailed description of preferred embodiments and practices thereof and from the drawings wherein like reference numerals are used to identify like items throughout.

DESCRIPTION OF PREFERRED EMBODIMENTS AND PRACTICES

Figure 1:
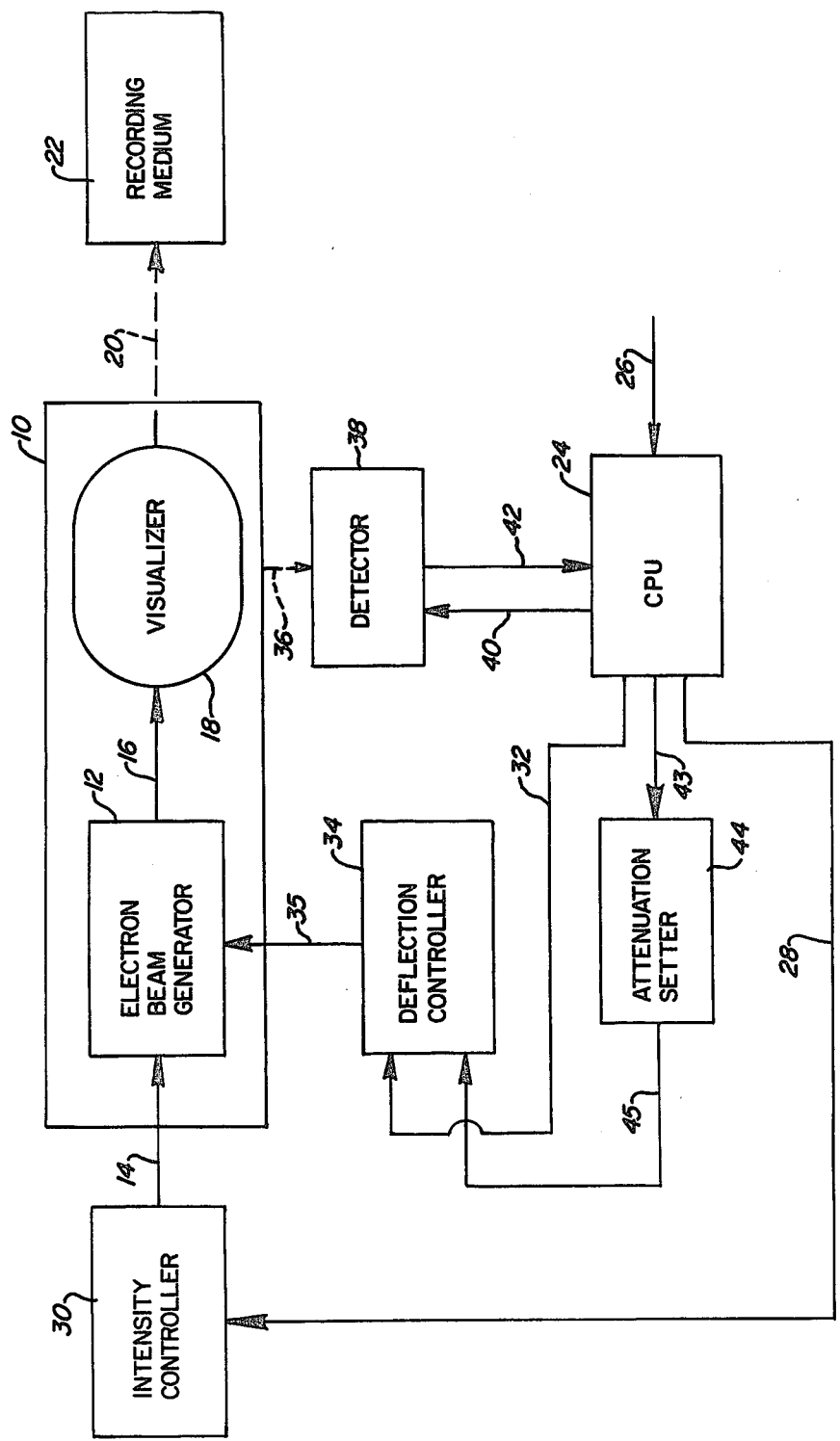
FIG. 1 is a functional block diagram of a system in accordance with the invention.

Referring to FIG. 1, electron beam-light emission apparatus 10, typically a CRT, includes an electron beam generator 12 having an electron emission cathode and a control grid adapted to generate an electron beam whose intensity is controllable by the direct-current voltage level of input line 14. The generated beam 16 interacts with visualizer 18 which, in the instance of a CRT electron beam-visualization interface, is a phosphor-coated faceplate. Visualizer 18 is in optical communication through path 20 with recording medium 22. As alluded to above, path 20 entails a lens which is linewise movable to record patches comprising a line and medium 22 is incrementally advanced for page recording. Such practice permits desirable use of a relatively small-sized CRT. Since the visualization is by light energy, recording medium 22 is light-sensitive in its recordation capability.

In presently known computer typesetting systems, a CPU (central processing unit) 24 is operatively responsive to source information on line 26 both to provide an intensity information signal on line 28 to intensity controller 30 and horizontal and vertical beam deflection signals on line 32 to deflection controller 34. Thus, if source information on line 26 calls for electron beam definition of the character "a", a horizontal stepping sequence and vertical tracing is correlated with a vertical intensity pattern by CPU 24 to define the character "a" in a plurality of adjacent vertical traces. Signals defining the stepping sequence and the vertical trace are applied to lines 32 and signals defining the intensity pattern are applied to line 28. The vertical trace velocity is typically two hundred or so times the horizontal stepping velocity and the vertical intensity signal(s) occurring during each vertical trace writes the character contribution for each horizontal step.

In one practice under the present invention, discernible indicia are included in visualizer 18 in the field of view 36 of detector 38. Lines 40 and 42 interconnect CPU 24 with detector 38. Based on events discussed below, CPU 24 furnishes control signals over line 43 to attenuation setter 44 which in turn outputs on line 45 to deflection controller 34, which applies beam deflecting signals to line 35.

Figure 3:
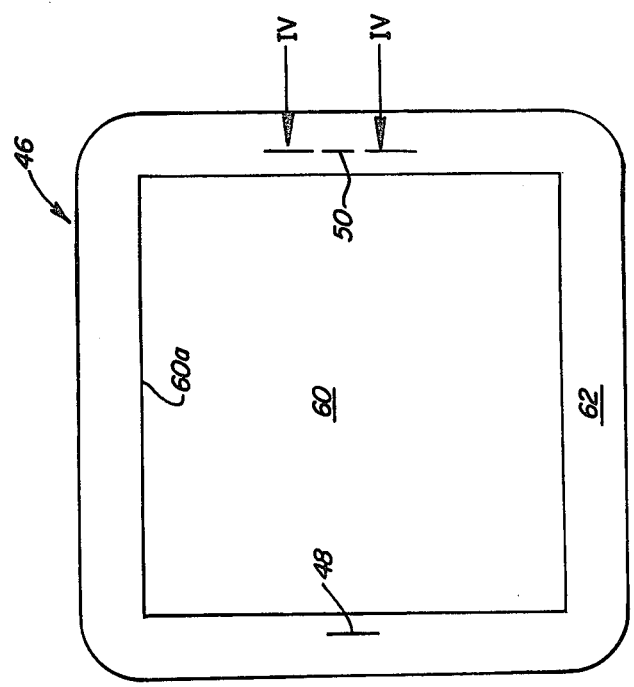
FIG. 3 is a front elevation of a CRT configured in accordance with one embodiment of the invention.

CRT 46 of FIG. 3 is equipped with such discernible indicia 48 and 50. In a particularly preferred embodiment, seen for indicia 50 in the sectioned portion of FIG. 4, faceplate 52 is an assembly of transparent plate 53 and phosphor layer 54 bonded thereto. Indicia 50 is formed by removal of phosphor from layer 54 to form a vertical slit. This may be accomplished by deflecting the electron beam at high intensity onto layer 54 at the desired slit location and ablating the phosphor. There results a predetermined location of the CRT screen which will emit substantially less light, when the beam is incident thereon, than immediately adjacent areas will emit when the beam is incident thereon. A detector looking at such location and the adjacent areas in the course of beam scanning of the location the area can thus discern the indicium.

Figure 4:
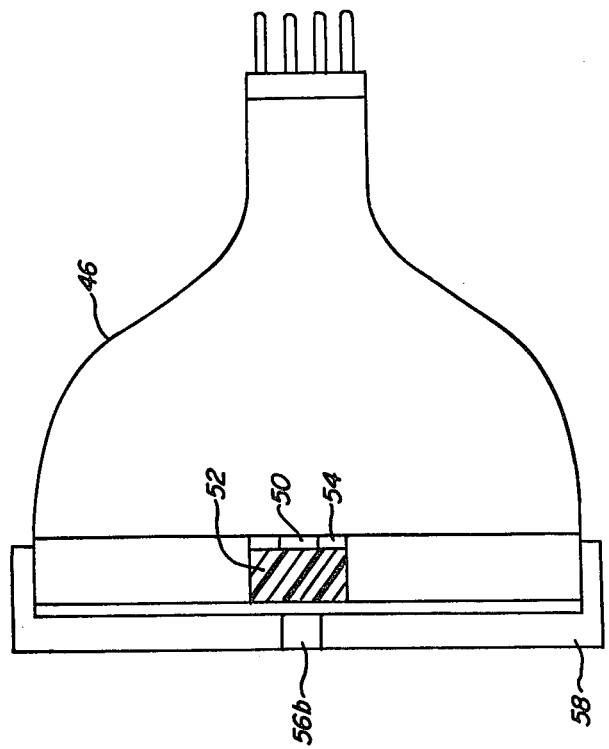
FIG. 4 is a side elevation of the FIG. 3 CRT with additional showing of a detector of the invention, the CRT being sectioned in part to show interior detail such as would be seen at partial plane IV—IV of FIG. 3.
Figure 5:
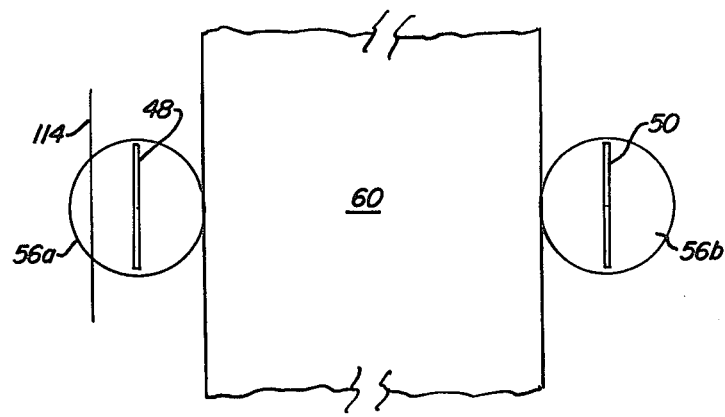
FIG. 5 is schematic voltage/space diagram which depicts calibrated and uncalibrated states of the FIG. 1 system.

Detector 38 of FIG. 1 is embodied in FIG. 4 by a photodiode 56b in registry with indicium 50, another photodiode 56a (FIG. 5) in registry with indicium 48, and a support frame 58 which is suitably secured to face plate 52. As will be appreciated, CRT 46 is shown without the photodiodes and frame 58 in FIG. 3.

Portion 60 (FIG. 3) of CRT 46, bounded by imaginary rectangle 60a, is preselected as the presentation area for characters to be recorded. The remaining marginal CRT portion 62 is perimetrically exterior to CRT portion 60 and includes the locations at which indicia 48 and 50 are disposed. A digital subdivision of the horizontal distance between indicia 48 and 50, for example, $2^{12}$ or 4096 steps or positions (digital subdivisions 0 through 4095) is now assigned such that the system will be in calibration whenever 4096 vertical traces occur in a full horizontal sweep from indicia 48 to indicia 50. For convenience, only the horizontal situation is now considered since the practice being outlined may readily be adapted for control use along any desired direction.

Figure 2:
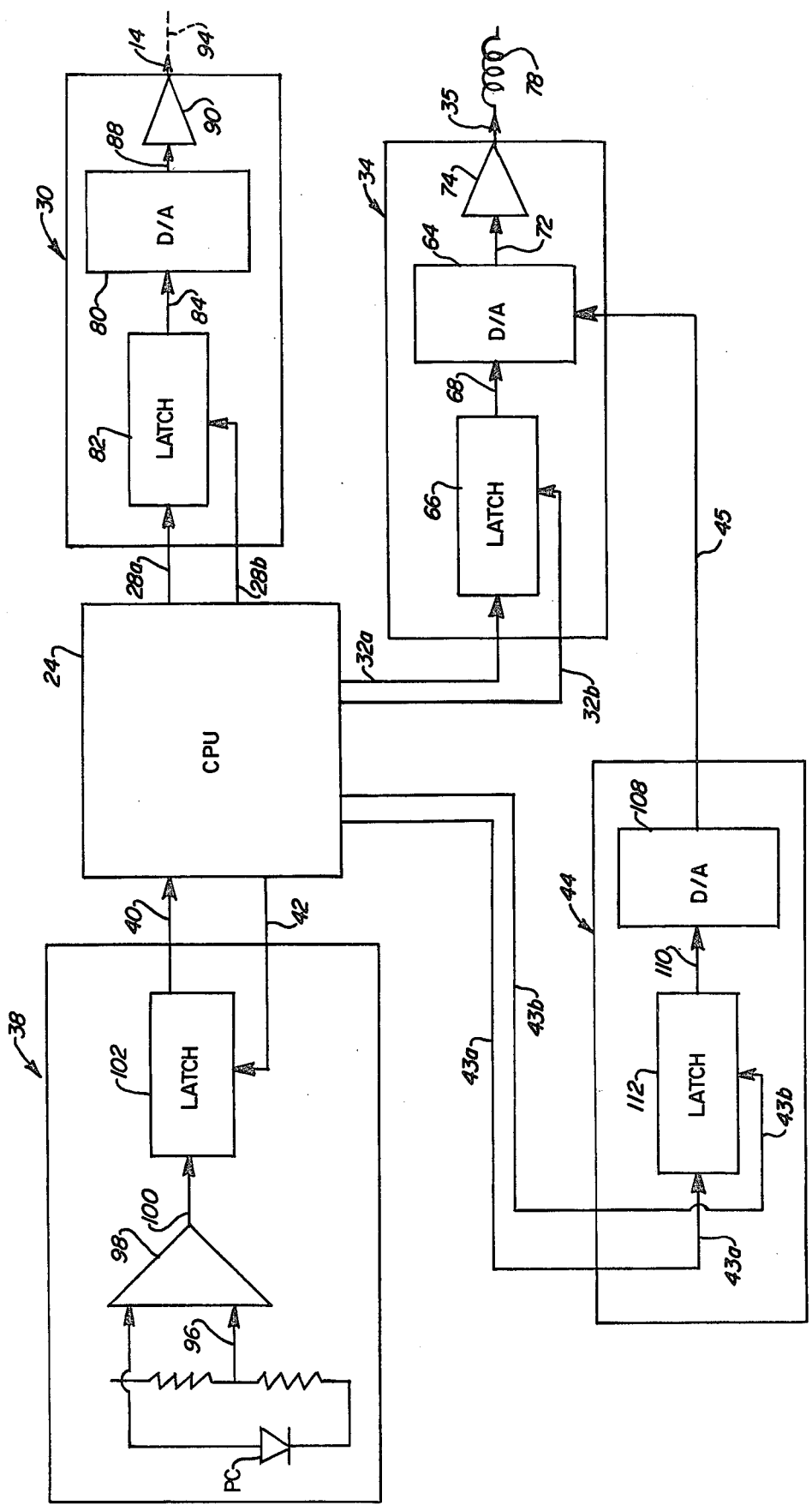
FIG. 2 is a detailed schematic drawing of a preferred rendition of the FIG. 1 system.

In the FIG. 2 system, deflection controller 34 includes a twelve-bit ($2^{12}$) digital-to-analog (D/a) converter 64 for conversion as between digital values of from zero to 4095, in keeping with the above-elected digital subdivision selection, and analog voltage values between negative and positive d.c. voltages. Accordingly, at the center of the CRT, i.e., horizontal step 2048 (digital input 2047), zero beam deflection is at hand. Converter 64 receives its character horizontal-defining digital input from latch circuit (latch) 66 over line 68, the latch receiving its input from CPU 24 over line 32. Converter 64 applies its analog output voltage to line 72 for amplification in amplifier 74 and thence over line 35 to horizontal deflection yoke 78 of the CRT.

Intensity controller 30 includes a D/a converter 80, which receives its character-defining digital input from latch 82 over line 84, the latch receiving its input from CPU 24 over line 28. Converter 80 applies its analog output voltage to line 88 for amplification in amplifier 90 and thence over line 14 to grid 94 of the CRT.

Operation of the circuit components of controllers 30 and 34 with CPU 24 is typical to the point of present discussion. Thus, for each horizontal step, the horizontal step character information is provided by CPU 24 to latch 66 and hence to converter 64. The character intensity information is furnished by the CPU to latch 82 and hence to converter 80 while vertical beam deflection is being effected by the CPU.

As alluded to above, electronic analog component deterioration of resistors, capacitors and other circuit elements of converter 64 and amplifier 74, and variations in performance of defelection yoke 78 bring on misregistration of the electron beam generated character patches with required locations for same on the CRT face. Thus, although the CPU will call for the same digital spread of 4096 units and the voltage swing corresponding to the digital spread, the voltage swing actually applied to the yoke may be otherwise or the yoke may react to a proper applied voltage as if a lesser voltage had been received.

In its correction of this situation, the invention introduces detector 38 and embodies same with photodiode PC of FIG. 2 for each of indicia 48 and 50. A reference voltage is established on line 96 and is applied with the PC output voltage to comparator 98. The comparator output is applied over line 100 to latch 102. The latch output is furnished to CPU 24 over line 40 and the CPU may clear the latch over line 42. The invention also introduces attenuation setter 44 and embodies same with eight-bit $2^8$) D/a converter 108, the digital input to which is furnished on line 110 by latch 112. The input to latch 112 is provided by CPU 24 on line 43. The analog output voltage of D/a converter 108 is applied to line 45 to effect voltage attenuation in D/a converter 64 of deflection controller 34.

In system setup, CPU 24 sets intensity controller 30 to a low level, sets horizontal controller 34 to dispose the CRT beam to the left of indicium 48 (FIG. 5) and effects a vertical trace. The state of latch 102 is examined to determine whether character (stripe) 114 of FIG. 5 has been painted on the CRT face. If the stripe is not painted, as is the case at the low level inteninten- sity, then the PC output does not exceed the reference voltage on line 96 and comparator 98 does not set latch 102. This practice is repeated at increased settings of intensity controller 30 until latch 102 is set. This yields a threshold setting for electron beam intensity and the CPU now clears latch 102 and augments the setting of amplifier 90 to establish an intensity somewhat greater than such threshold intensity.

Figure 6:
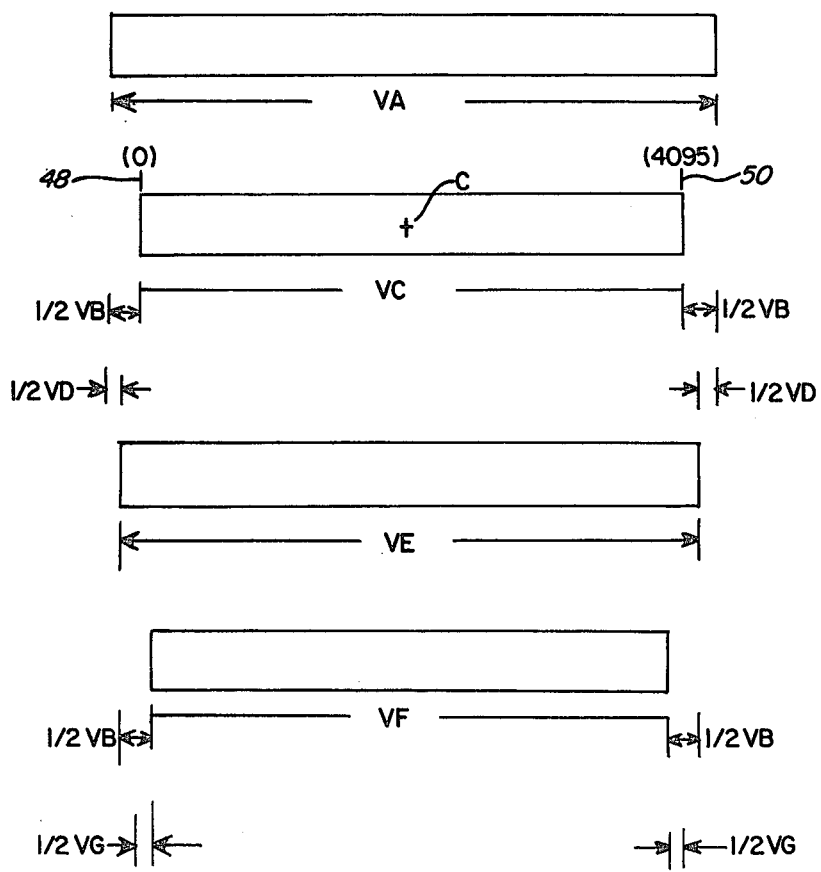
FIG. 6 is a schematic illustration useful in discussing a pre-calibration practice of the invention.

With beam intensity established, initial horizontal calibration is now effected as follows. Converter 64 is selected to have, for example, an output voltage swing, from digital input zero to digital input 4095 ($2^{12}$), of $-5$ to $+5$ volts. Converter 108 is selected to have an input range of from zero to digital 255 ($2^8$), and is set to half digital input, e.g., step 128, whereby it provides an output analog voltage on line 45 such that the output voltage swing capability of converter 64 is diminished to $-4.75$ to $+4.75$ volts. Mechanical measurement is now made at the CRT face to properly locate the indicia. Beam deflection is now set to place the electron beam in registry with the location for indicium 48 and the beam is then set at extremely high intensity and extrememly slow sweep rate whereby indicium 48 is burned into the CRT by high intensity phosphor ablating as above discussed. This practice is now repeated at the location for indicium 50. The condition of the system at this juncture may be seen from the voltage/ space schematic of FIG. 6, wherein VA represents the full voltage swing output of converter 64 prior to attenuation by converter 108, VB represents the output voltage of converter 108 at half digital input, and VC represents the actual output voltage swing of converter 64 as attenuated by converter 108 at its Midrange setting. C is the center of the display and indicia 48 and 50 are coincident with the beam at digital inputs zero and 4095 to converter 64.

Should all components of the system remain in their states existing during the forming of indicia 48 and 50, such horizontal calibration of the system would persist. In the event of performance degradation of, for example, deflection amplifier 74 (FIG. 2), miscalibration occurs. Considering the lessened amplification to result in a loss of voltage of VD (FIG. 6) from original voltage swing VA, and VB to remain constant due to the continued half digital input condition of converter 108, the actual output of amplifier 74 is now represented by VF, i.e., a departure of VG from the calibrated VC representation. Two problems are presented. First, the miscalibration need be detected. Second, voltage decrement VG need be added to the system to return it to horizontal calibration.

Figure 7:
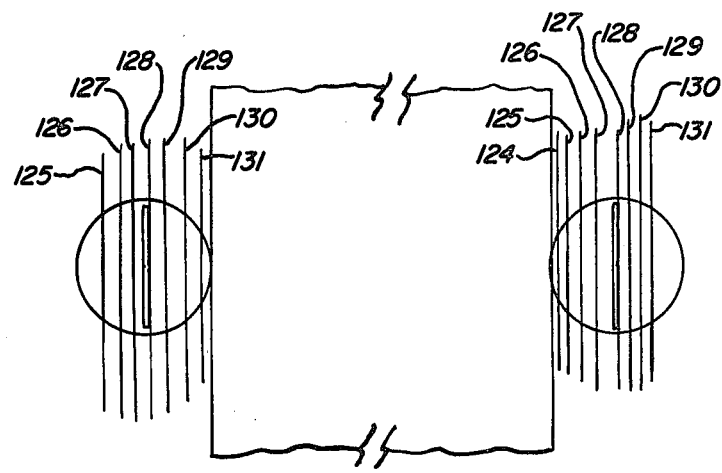
FIG. 7 and 8 are schematic illustrations used in discussing calibration and registration control practices of the invention.
Figure 8:
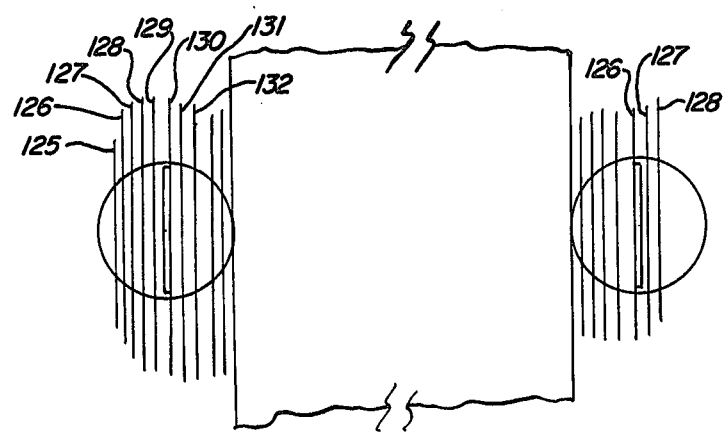
Figure 9:
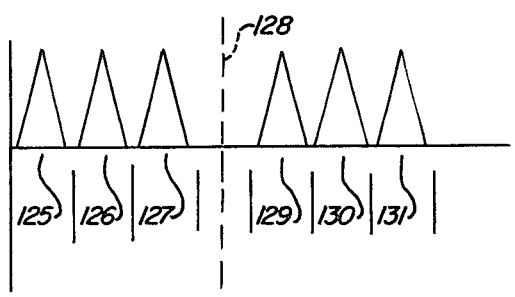
FIGS. 9 and 10 are representations of detector output signals corresponding respectively to the practices of FIGS. 7 and 8.
Figure 10:
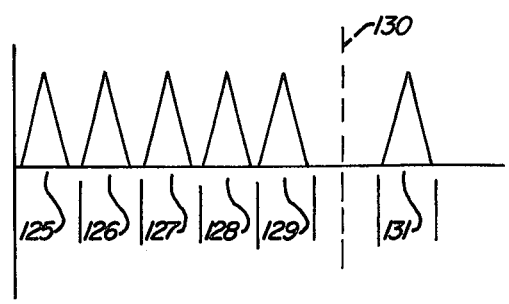

To test for calibration, the inputs to converters 64 and 108 are set to digital zero. The CPU now steps latch 112 incrementally to the count of slightly more than $2^7$ or such greater count as may be needed to locate indicium 48, say one hundred and forty steps, painting a stripe for each step, and observing the state of detector latch 102 at each step. In the calibrated condition, the photodiode viewing indicium 48 and adjacent area is excited as is shown in FIGS. 7 and 9. At steps 125, 126, 130 and 131 a full amplitude signal above threshold level T is provided by the photodiode. Such magnitude diminishes in steps 127 and 129 as the indicium at step 128 is approached and passed by. A quite low amplitude signal is found at step 128 since the CRT phosphor is vastly removed at this location. This indicates a calibration condition at the left side of the screen. For completeness, the test continues by now setting converter 64 to maximum digital input and then repeating the stepping practice, i.e., by incrementing the input to converter 108 from zero to the count of slightly more than $2^7$. Here, in the calibrated condition, as step 128 is reached, coincidence of the electron beam with indicium 50 occurs as shown at the right side of FIG. 7.

Where miscalibration exists, as depicted in FIGS. 8 and 10 and occasioned perhaps by an increase in the CRT high voltage due to e.g. temperature, humidity, or age, indicium 48 is not detected until steps beyond step 128, such as digital 130, input to converter 108 and indicium 50 is not detected until steps beyond step 128, such as digital 130, input to converter 108. The difference involved in this example, as between the calibrated and miscalibrated states is indicated by characteristics of the detector outputs, namely, two steps on a scale of 256 steps. If the input to converter 108 is now increased from 128 to digital 130, the attenuation of the previously attenuated $-5v$ to $+5v$ output of converter 64 is increased, such that the now attenuated output of converter 64 decreases accordingly to the level required for registration as between the CRT beam sweep and the horizontal CRT faceplate extent assigned to text display purpose, i.e., preselected portion 60 (FIG. 3).

Figure 12:
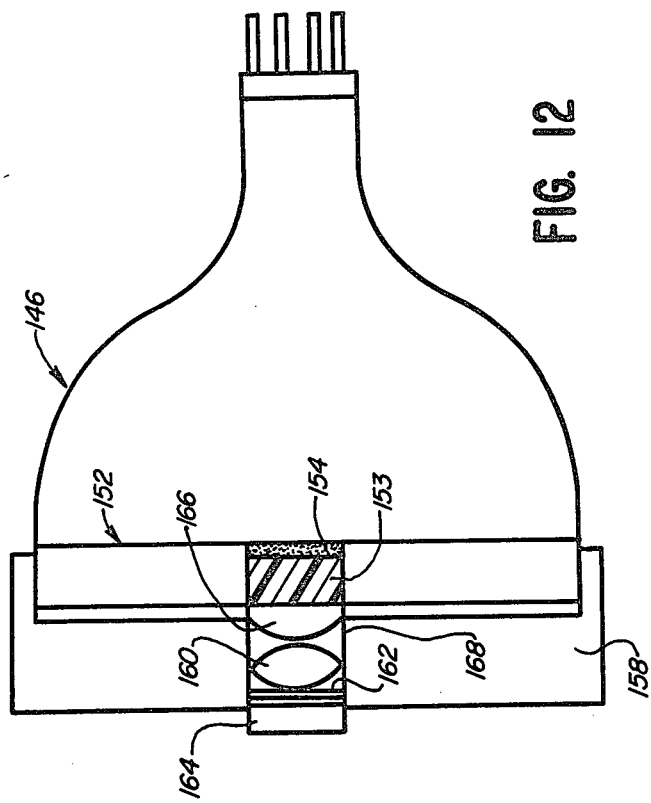
FIG. 12 is a side elevation of the FIG. 11 CRT with additional showing of a further detector of the invention, the CRT being sectioned in part to show interior detail such as would be seen at partial plane XII—XII of FIG. 11.
Figure 11:
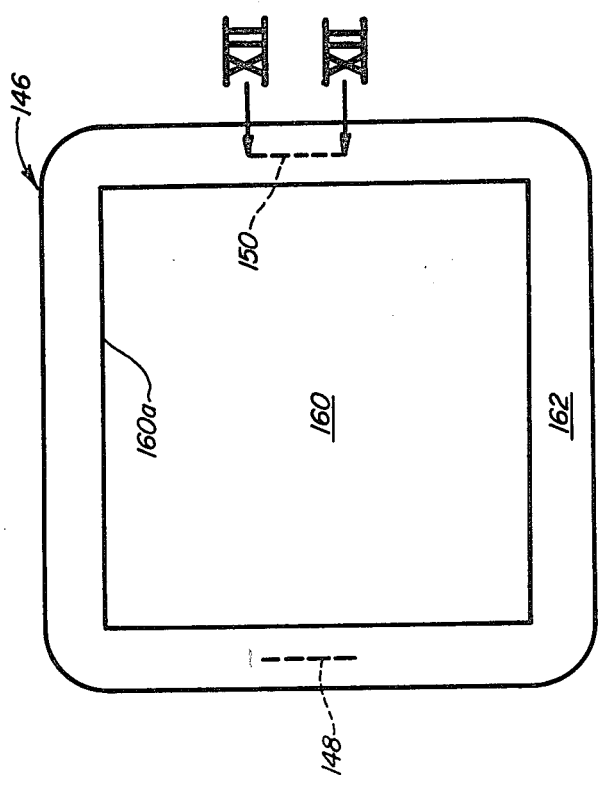
FIG. 11 is a front elevation of a further CRT for use in accordance with the invention.
Figure 13:
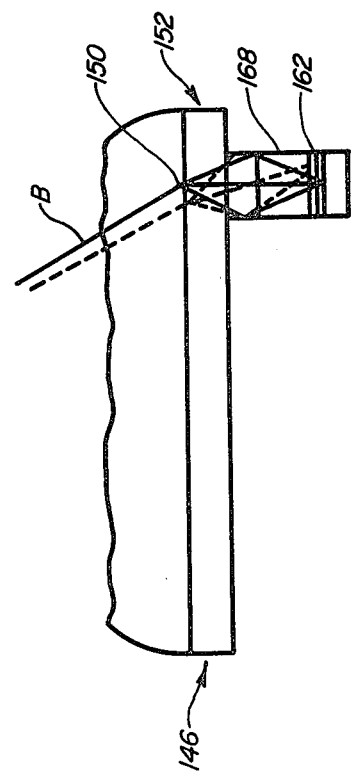
FIG. 13 is a schematic top plan view of FIG. 12.

Referring now to FIGS. 11-13, CRT 146 is of conventional type, i.e., the phosphor layer 154 of its faceplate 152 is fully continuous (unablated) and is bonded to transparent plate 153. Portion 160 of the faceplate is selected for presenting text for recordation and portion 162 is outboard of imaginary rectangle 160a. Predetermined locations 148 and 150 are selected to serve in the stead of indicia 48 and 50 of the previously discussed embodiment. Support frame 158 includes mask 162 and photodiode 164 in registry with location 150. Lens 166 is preferably bonded to plate 153 and seats in shroud 168. Counterparts (not shown) to members 160-168 are provided in registry with location 148.

As is shown in FIG. 13, mask 162 has a slit which limits the field of view of photodiode 164 and permits only for incidence on photodiode 164 of light emitted from faceplate 152 at location 150, i.e., upon incidence of beam B upon phosphor coincident with location 150. As is shown by broken lines, when beam B is not incident with location 150, light emitted and focused issues upon mask 162 outboard of the slit and is not seen by the photodiode. In the course of calibration and system corrective operation, the output signals of the photodiodes in registry with locations 148 and 150 are inverse in amplitude to those of photodiodes 56a and 56b above and may likewise be examined against a time base to provide for correct setting of converter 108.

The practice outlined is of course performable without need for CPU 24. Thus, one can generate the digital inputs to converters 64, 80 and 104 by any suitable digital signal generating circuitry. The signal patterns of FIGS. 9 and 10 may be visualized on an oscilloscope and correction made by deriving the modified digital input to converter 108 directly from the oscilloscope patterns displayed. The invention is, however, desirably practiced in the embodiment under discussion by suitable programming of the CPU used for character generation.

In practical use of the invention, the registration control method is introduced in the overall operation of the character visualization and recording system as needed on a statistical need basis, for example, once per each twenty or thirty minutes of system operation. Since the practice occurs in the outward sweeps of the CRT beam, i.e., exterior to the digital subset selected for presentation of information to be recorded, it can occur during a write operation, without affecting system operations.

In implementing the system embodiment of FIG. 2, latches 66, 82, 102 and 112 may be commercially available 74273 latches produced by Texas Instruments, converters 64, 80 and 108 may be commercially available 1408 D/A Converters produced by Motorola, or Ad565's Produced by Analog Devices photodiodes PC may be commercially available 915 photodiodes produced by the Optron subsidiary of TRW and comparator 98 may be a commercially available linear module LM339 produced by National Semiconductor. Suitable circuitry for effecting the attenuation of the output voltage swing of converter 64 and thus interconnecting converters 64 and 108 is set forth at page 5 of the Applications Brochure AD 565, published by Analog Devices.

While the invention has been shown and described by way of the foregoing particularly preferred embodiments and practices, various changes may be introduced without departing from the invention. For example, the indicia may be provided by practice other than the burning in thereof by the CRT beam. Opaque strips may provide the indicia, either being placed on the faceplate prior to applying the phosphor layer thereto or being applied to the exterior opposed side of the faceplate. In the latter instance, suitable optics are added prior to detectors 56a and 56b for focusing purposes on the strip to insure that light emitted from areas of the faceplate adjacent the strip are not delivered to the detectors to be misinterpreted as coming from the location of the strip.

Other electronics than particularized in FIG. 2 and identified above may be employed to effect the practice of the invention wherein horizontal presentation extent is maintained constant by selecting a beam sweep voltage swing greater than needed for the horizontal presentation extent, selecting an attenuating voltage for summation with the overvoltage swing and modifying the latter voltage upon detecting instances of failure of coincidence of the beam sweep and the horizontal extent.

The preferred embodiments and practices particularly disclosed are thus intended in an illustrative and not in a limiting sense. The true spirit and scope of the invention are set forth in the following claims.

We claim:

1. In a method for using an electron beam-light emission interface for optical recording of information defined in said electron beam, a registration method comprising the steps of:
   (a) selecting a portion of said interface for presentation of beam-generated information to be optically recorded;
   (b) placing such selected interface portion in optical communication with a recording medium; and
   (c) interacting said beam with said interface in a predetermined location on said interface exterior to said selected interface portion to effect registration of said beam-generated information with said selected interface portion.

2. The method claimed in claim 1 wherein said step (c) is practiced in part by scanning said interface with said electron beam and by disposing in said location an indicium discernible from area of said interface adjacent said location in the course of said electron beam scanning.

3. The method claimed in claim 2 wherein said interface is selected to have horizontal and vertical expanse, and wherein in said practice of said step (c), said electron beam is displaced in a vertical trace successively at each of a plurality of horizontal positions across said interface and wherein said indicium is provided with the characteristic of eliminating light emission by said interface upon impingement of said electron beam on said location 4. The method claimed in claim 3 wherein in said practice of said step (c), electrical output signals are generated indicative of whether or not said interface emits light in the course of said electron beam scanning.

5. The method claimed in claim 3 wherein said indicium is created by placing said electron beam in registry with said location and vertically deflecting said beam at such location until said interface does not emit light at said location.

6. The method claimed in claim 4 wherein characteristics of said output signals are used to effect said registration of said beam-generated information with said selected interface portion.

7. The method claimed in claim 6 wherein said plurality of horizontal positions includes a digital subset corresponding in number with the extent of said selected interface portion and wherein said output signals are indicative of digital positional relationship as between said indicium and said subset.

8. The method claimed in claim 1 wherein said step (c) is practiced in part by scanning said interface with said electron beam and by detecting the incidence of said beam upon a predetermined location on said interface.

9. The method claimed in claim 8 wherein a photodiode is used for such detection, the field of view of said photodiode being limited to such predetermined location.

10. A method for maintaining constant the horizontal extent of presentation in a CRT display system, comprising the steps of:
   (a) selecting a first deflection voltage swing adapted for sweeping the electron beam of said CRT over a horizontal range exceeding said horizontal extent;
   (b) generating a second voltage for attenuating said first deflection voltage swing to a second deflection voltage swing of such value as to render such CRT beam sweep coincident with said horizontal extent;

(c) detecting instances wherein said CRT beam sweep is not coincident with said horizontal extent; and (d) modifying said second voltage upon such detected instances thereby to modify the attenuation of said first deflection voltage swing to maintain said second voltage swing at said value thereof.

11. The method claimed in claim 10 wherein said step (c) is practiced in part by scanning the faceplate of said CRT with said electron beam and by disposing in a location outward of said horizontal extent an indicium discernible from area of said faceplate adjacent said location in the course of said electron beam scanning.

12. The method claimed in claim 11 wherein said faceplate is selected to have horiztonal and vertical expanse, and wherein in said practice of said step (c), said electron beam is displaced in a vertical trace successively at each of a plurality of horizontal positions across said faceplate and wherein said indicium is provided with the characteristic of eliminating light emission from said face plate upon impingement of said electron beam on said location.

13. The method claimed in claim 12 wherein in said practice of said step (c), electrical output signals are generated indicative of the magnitude of light emissions in the course of said electron beam scanning.

14. The method claimed in claim 10 wherein said indicium is created by placing said electron beam in registry with said location and vertically deflecting said beam at such location until said faceplate emits less light at said location than is emitted at areas of said faceplate adjacent said location upon registration of said beam therewith.

15. The method claimed in claim 13 wherein characteristics of said output signals are used to effect registration of said CRT beam sweep with said horizontal extent.

16. The method claimed in claim 15 wherein said plurality of horizontal positions includes a digital subset corresponding in number with said horizontal extent and wherein said output signals are indicative of digital positional relationship as between said indicium and said subset.

17. The method claimed in claim 10 wherein said step (c) is practiced in part by scanning said interface with said electron beam and by detecting the incidence of said beam upon a predetermined location on said interface.

18. The method claimed in claim 17 wherein a photodiode is used for such detection, the field of view of said photodiode being limited to such predetermined location.

19. A system for providing registration of an information defining electron beam with a preselected portion of an electron beam-light emission interface, comprising:

(a) discernible means with said interface for defining a location on said interface having a predetermined spatial relation to said interface portion;
(b) detector means having a field of view inclusive of said discernible means and area of said interface adjacent said discernible means and generating output signals;
(c) a beam deflection controller; and
(d) circuit means connected to said detector means and said controller for operating said controller responsively to said output signals of said detector means.

20. The system claimed in claim 19 wherein a cathode-ray tube constitutes said electron beam and said electron beam-light emmission interface.

21. The system claimed in claim 20 wherein said discernible means comprises at least one indicium member disposed in registry with such interface location and rendering said interface light non-emmissive upon impingement of said electron beam on said location.

22. The system claimed in claim 21 wherein said cathode-ray tube has a phosphor layer defining said light emission interface, said indicium member being constituted by an absence of said phosphor from said layer at said location.

23. The system claimed in claim 19 wherein said beam deflection controller includes a digital-to-analog converter having an output voltage swing in excess of the voltage swing required for deflection of said electron beam throughout said interface portion.

24. The system claimed in claim 23 wherein said circuit means includes a further digital-to-analog converter connected to said first-mentioned digital-to-analog converter and adapted to attenuate the output voltage swing of said first mentioned digital-to-analog converter to the voltage swing required for deflection of said electron beam throughout said interface portion.

25. A system for providing registration of an information defining electron beam with a preselected portion of an electron beam-light emission interface, comprising:

(a) detector means having a field of view limited to first and second locations on said interface outside said interface portion and having predetermined spatial relations to said interface portion for generating output signals;
(b) a beam deflection controller; and
(c) circuit means connected to said detector means and said controller for operating said controller responsively to said output signals of said detector means.

26. The system claimed in claim 25 wherein a cathode-ray tube constitutes said electron beam and said electron beam-light emission interface.

27. The system claimed in claim 26 wherein said beam deflection controller includes a digital-to-analog converter having an output voltage swing in excess of the voltage swing required for deflection of said electron beam throughout said interface portion.

28. The system claimed in claim 27 wherein said circuit means includes a further digital-to-analog converter connected to said first-mentioned digital-to-analog converter and adapted to attenuate the output voltage swing of said first mentioned digital-to-analog converter to the voltage swing required for deflection of said electron beam throughout said interface portion.

* * * * *